United States Patent [19]

Buttrey

[11] 4,356,869
[45] Nov. 2, 1982

[54] FIRE SUPPRESSING APPARATUS
[75] Inventor: Kenneth E. Buttrey, Northridge, Calif.
[73] Assignee: The United States of America as represented by the United States Department of Energy, Washington, D.C.
[21] Appl. No.: 218,248
[22] Filed: Dec. 19, 1980
[51] Int. Cl.³ .............................................. A62C 7/00
[52] U.S. Cl. .................................. 169/49; 220/88 R; 376/279
[58] Field of Search .................... 169/48, 49, 54, 45, 169/65, 66; 376/279; 220/88 R, 1 C; 239/120, 121

[56] References Cited
U.S. PATENT DOCUMENTS

| | | | |
|---|---|---|---|
| 2,437,058 | 3/1948 | Wayens | 220/88 R |
| 3,714,986 | 2/1973 | Broadley | 169/49 |
| 3,871,459 | 3/1975 | Falgayhettes et al. | 169/49 |
| 4,091,875 | 5/1978 | Colomne et al. | 169/49 |
| 4,294,279 | 10/1981 | Wueth | 220/88 R |

FOREIGN PATENT DOCUMENTS 2454676  12/1980  France ...................... 376/279

Primary Examiner—Joseph J. Rolla
Assistant Examiner—Kenneth Noland
Attorney, Agent, or Firm—Edwin D. Grant; Stephen D. Hamel; Richard G. Besha

[57] ABSTRACT

Apparatus for smothering a liquid sodium fire comprises a pan, a perforated cover on the pan, and tubes depending from the cover and providing communication between the interior of the pan and the ambient atmosphere through the perforations in the cover. Liquid caught in the pan rises above the lower ends of the tubes and thus serves as a barrier which limits the amount of air entering the pan.

11 Claims, 5 Drawing Figures

FIRE SUPPRESSING APPARATUS

BACKGROUND OF THE INVENTION

This invention, which was made under a contract with the United States Department of Energy, relates to a fire control means and, more particularly, to an improved system which minimizes the hazards and damage resulting from accidental release of liquid sodium from heat transfer components of a nuclear power generator.

It has been demonstrated heretofore that liquid sodium leaking from process equipment can be caught in a container provided with means for blanketing the sodium with inert gas or particulate matter to thereby smother combustion. However, known fire suppressing systems of this type are not entirely satisfactory. For example, in a previously divulged apparatus wherein liquid sodium is caught in a container, considerable ambient air can enter the container to support combustion of the sodium. Furthermore, the amount of sodium that can be handled by known container-type fire control systems is limited.

PRIOR ART

U.S. Pat. No. 3,714,986 discloses a fire suppression system comprising a trough covered by a perforated plate and means for blanketing burning sodium collected in the trough with both particulate material and an inert gas.

U.S. Pat. No. 3,871,459 discloses a fire suppression system comprising a container for collecting burning sodium, blanketing means of the type disclosed in U.S. Pat. No. 3,714,986, and in addition a mass of material having a high heat-absorption capacity for reducing the temperature of the sodium to a level below its auto-ignition temperature.

SUMMARY OF THE INVENTION

It is an object of this invention to provide an improved system for extinguishing fires involving combustible liquids.

Another object of the invention is to provide apparatus for catching burning liquid sodium and maintaining it under conditions which extinguish the fire and protect the environment from heat released thereby.

A further object of the invention is to provide a fire suppressing system which effectively limits the amount of air that can enter a catch pan used in the system, and which can collect a large amount of a burning liquid in plural, interconnected catch pans.

These objects and other advantages of the invention are achieved in a preferred embodiment thereof that comprises (1) a pan for receiving a flowable, burning material, (2) a cover on said pan having perforations therein, and (3) tubes depending from said cover and communicating with the ambient atmosphere above the cover through respective ones of said perforations, the lower ends of said tubes being spaced a short distance from the bottom of said pan so that the flowable material entering the tubes will quickly rise above their lower ends and thus limit the amount of air entering the interior space within the pan and its cover. Other advantageous features of fire suppression apparatus constructed in accordance with the invention will be shown in the following detailed description thereof.

DESCRIPTION OF THE PREFERRED EMBODIMENTS OF THE INVENTION

Figure 1:
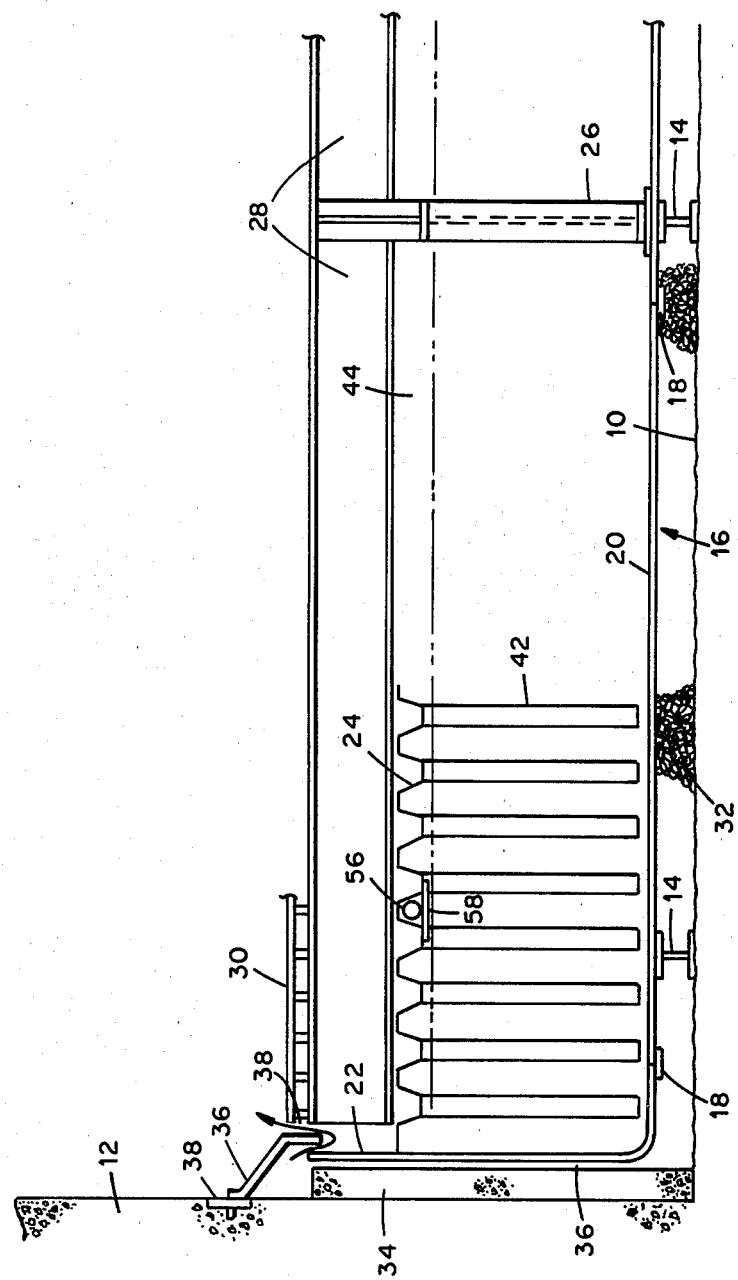
FIG. 1 is a sectional view illustrating a preferred embodiment of the invention.

In FIG. 1 reference number 10 designates a support surface that may be part of a building enclosing a nuclear reactor and the power generating equipment associated therewith. One structural concrete wall 12 of such a building is also illustrated. Steel I-beams 14 rest on the support surface 10 and support a pan generally designated by reference number 16, the pan conveniently being formed of steel plates welded to backup strips 18 and including a bottom 20 and side walls one of which is illustrated and designated by reference number 22. Pan 16 is also provided with a cover 24 formed of corrugated steel plate and attached to the side walls of the pan by suitable means so as to form a hermetic seal therebetween. Steel columns 26 (only one of which is illustrated) provide support for the cover at spaced points. Horizontal beams 28 are attached to columns in spaced relation above cover 24, and a grate-type floor 30 rests on these supports.

Heat insulation 32, such as coarse gravel, fills the space between support surface 10 and the bottom of pan 16 and heat insulation 34 of any suitable type, such as lightweight concrete panel, is also attached to each structural wall 12 adjacent the pan. The surface of insulation 34 is spaced from the confronting side wall 22 of the pan to provide a narrow gap therebetween. In addition, the edge of floor 30 is spaced from each side wall 22 to provide a gap at each side of the pan, in which the lower edge portion of a lip plate 36 is disposed in spaced relation with both the adjacent edge of the floor and the confronting side wall of the pan. The upper edge of each lip plate 36 is secured to a plate 38 embedded in a structural wall 12.

Figure 2:
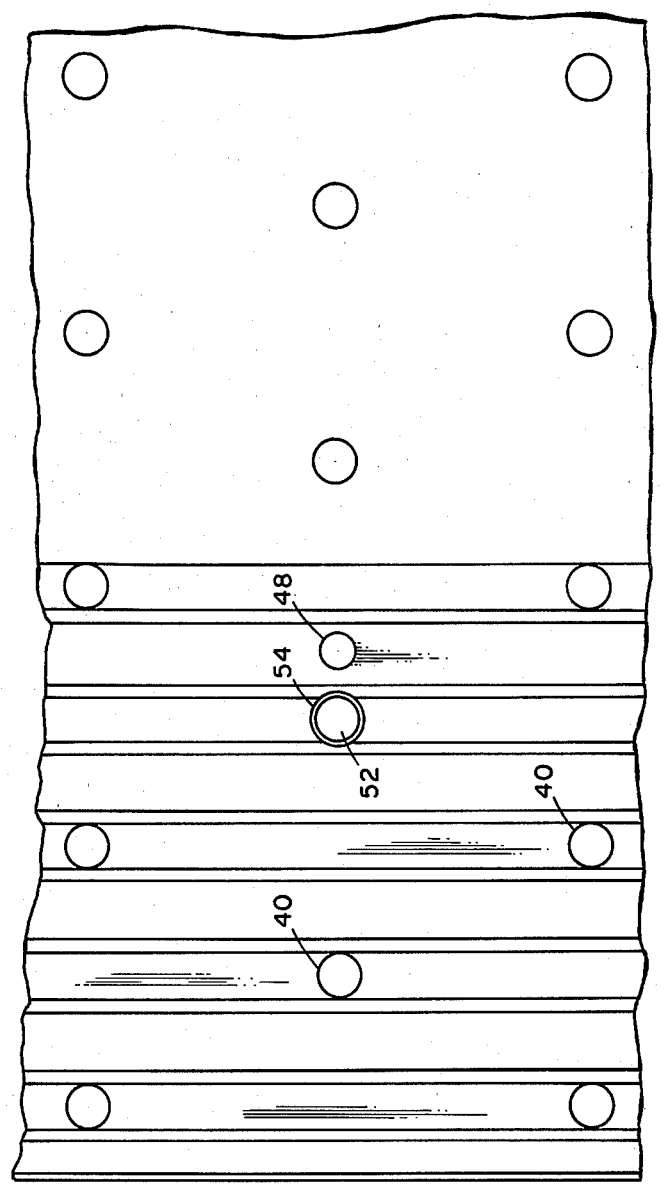
FIG. 2 is a plan view illustrating a cover included in the FIG. 1 embodiment of the invention.

Perforations 40 extend through cover 24 in the offset relation illustrated in FIG. 2, these perforations being located in the trough portions of the cover. Fixedly secured to cover 24 by suitable means, such as welding, and respectively coaxially aligned with perforations 40 are vertically disposed tubes 42, the lower ends of these tubes closely approaching but being spaced from the bottom 20 of the pan. Thus the interior space 44 within the pan and its cover communicates with space above the cover through tubes 42 and perforations 40.

Figure 3:
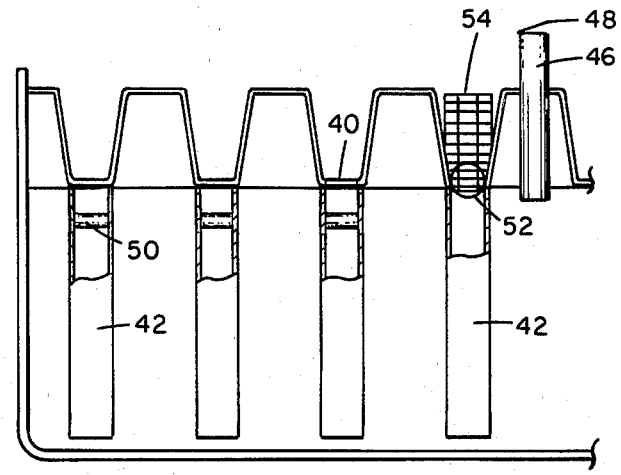
FIG. 3 is a sectional view illustrating modifications of components of the FIG. 1 embodiment of the invention.

FIG. 3 illustrates one type of vent means which may be incorporated in the described fire suppressing apparatus, this means comprising a pipe 46 which passes through a perforation in cover 24 and a flap 48 which is pivotally mounted on the outer end of said pipe, the flap closing the pipe when it rests thereon. Other one-way valve means obviously can be substituted for flap 48.

FIG. 3 also illustrates two modifications of the embodiment of the invention that has been described. In one variation an obturating member 50, formed of a material having a low melting point, is located in each tube 42. In a second variation a hollow sphere or float 52 rests on the edge of each perforation in cover 24 (or on the upper edge of the tube 42 associated with each perforation if the end of the tube is fitted in the perforation), and a wire cage 54 is provided to restrain the ball and guide it back into its illustrated seated position when it has temporarily been raised therefrom.

Illustrated in cross section in FIG. 1 is a pipe 56 held in position under cover 24 by a support strap 58. This pipe is connected to a means for forcing an inert gas or a particulate material through the pipe for discharge on liquid sodium collected in pan 16.

Figure 4:
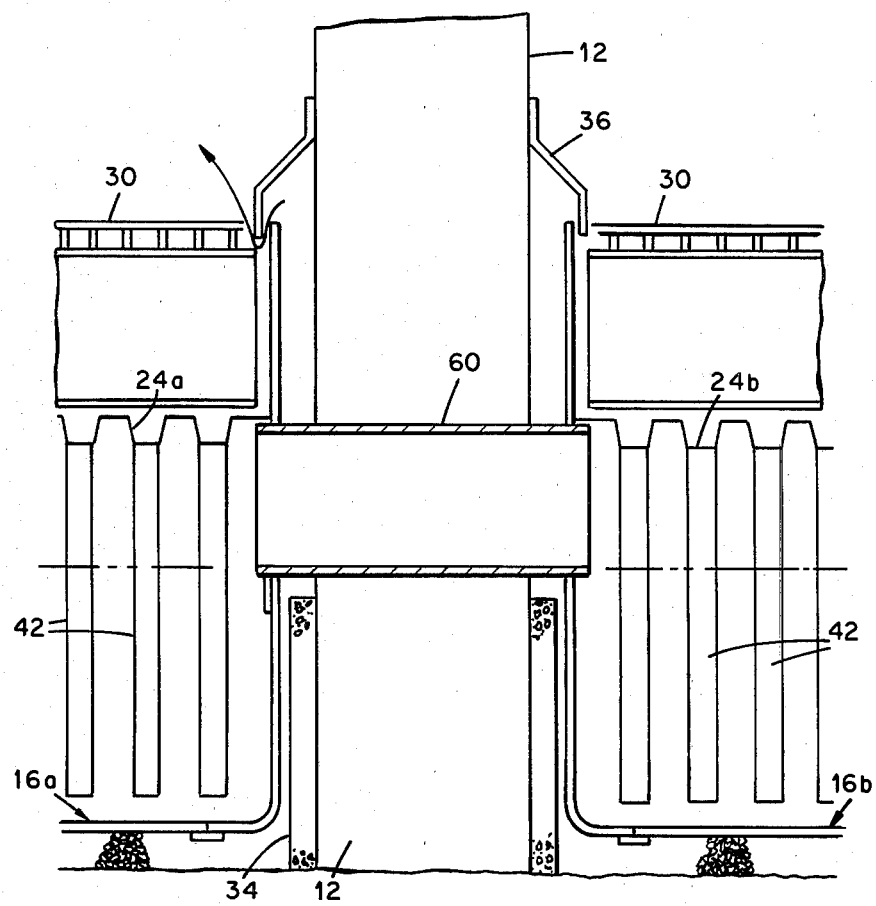
FIG. 4 is a sectional view illustrating an embodiment of the invention that comprises plural interconnected catch pans.

FIG. 4 illustrates an embodiment of the invention comprising two collecting pans 16a and 16b which communicate with each other by means of a pipe 60 extending through holes in the adjacent side walls of the pans.

Figure 5:
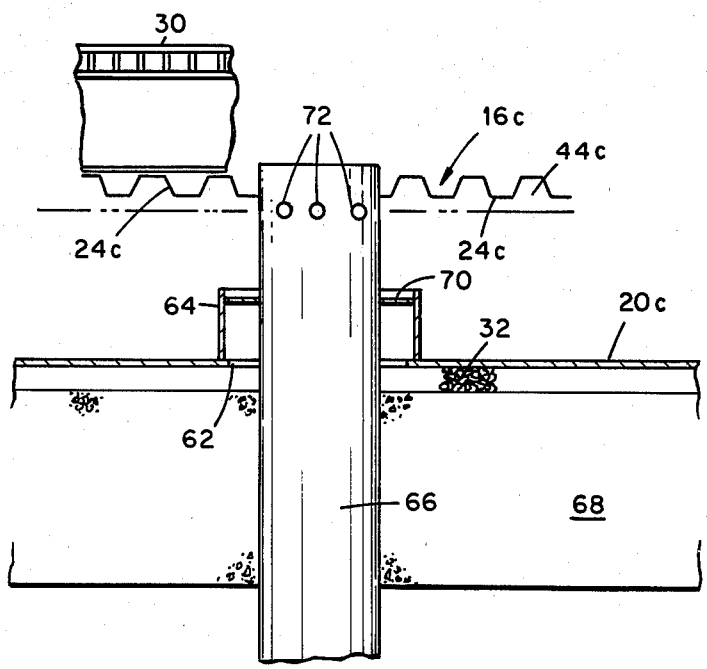
FIG. 5 is a sectional view of another embodiment of the invention comprising plural interconnected catch pans.

FIG. 5 illustrates another embodiment of the invention comprising a collecting pan which is generally designated by reference number 16c. The bottom plate 20c of pan 16c has an aperture 62 formed therein, and a tubular member 64 is attached to the inner surface of the bottom plate and communicates with this aperture. A vertically disposed pipe 66 extends through (1) a concrete slab 68 located below pan 16c (2) member 64, and (3) an aperture in a cover 24c attached to the side walls (not illustrated) of the pan. The annular gap between member 64 and pipe 66 is closed by a flexible seal ring 70 the edges of which are respectively attached to said member and said pipe. Holes 72 located in pipe 66 below cover 24c establish communication between the pipe and the interior 44c of pan 16c.

OPERATION OF THE PREFERRED EMBODIMENTS OF THE INVENTION

In the use of the above-described embodiments of the invention, a catch pan 16 will, of course, be located in an area where combustible liquid may spill or leak from process equipment or pipes. When such an accident occurs, the lost liquid may be ignited by contact with air or by an electrical spark or other means. The burning liquid will flow through the openings in floor 30 and into at least some of the troughs in the cover 24 of a pan 16. Then the liquid will flow through tubes 42 associated with the perforations 40 in those cover troughs which receive the liquid. Since tubes 42 terminate only a short distance above the bottom 20 of pan 16, the surface of liquid collected in the pan will quickly rise above the lower ends of the tubes, after which the liquid serves as a barrier blocking entry of air into the interior space 44 within the pan by way of the tubes. Air and gaseous products of combustion are permitted to escape from interior space 44 through pipe 46 as the level of liquid in the pan rises and the liquid burns, and the fire in the pan is extinguished when the amount of air in the pan becomes insufficient to support combustion of the liquid. Atmospheric air will also be prevented from entering tubes 42 by products of combustion which plug the tubes.

If tubes 42 are closed by meltable obturating members 50, as illustrated in FIG. 3, air will enter interior space 44 only through those tubes opened by flow of liquid into contact with obturating members. Likewise, if spheres 52 are used for closing tubes 42, air will enter the catch pan only through those tubes where liquid flows against, and lifts, spheres so as to open the tubes. Hence obturating members 50 and spheres 52 reduce the amount of air available for supporting combustion of liquid inside pan 16.

The embodiments of the invention illustrated in FIGS. 4 and 5 are used in situations where it may be necessary to transfer liquid caught in one container to another container which may or may not include a fire suppression cover such as cover 24 of FIG. 1. Pan 16b of the FIG. 4 embodiment of the invention may be located outside a wall 12 of a building in which pan 16a is enclosed, and pipe 60 conducts liquid to pan 16b when the liquid caught in pan 16a reaches the level of the pipe. Similarly, pipe 66 of the FIG. 5 embodiment of the invention conducts liquid outside a room in which pan 16c is situated when liquid caught in the latter reaches the level of apertures 72 in the pipe.

The gaps between insulation 34, lip plate 36, and the side wall 22 of pan 16 allow steam to escape from the region below the pan, as indicated by the arrow which illustrates the steam flow path in FIG. 1. This steam could be released from the aggregate 32 and concrete of the support surface 10 as a result of heating of these materials during a fire.

What is claimed is:

1. Apparatus for quenching combustion of flowable material such as liquid sodium comprising:
    a pan for receiving said flowable material;
    a cover on said pan having perforations formed therein; and
    tubes vertically disposed below said cover and, respectively, communicating with the space above said cover through said perforations, the lower ends of said tubes closely approaching but being spaced from the bottom of said pan so that said flowable material entering one or more of said tubes will quickly establish a surface level above said lower tube ends, vent means arranged to permit gas flow from the interior space within said pans and said cover to the space above said cover, and prevent gas flow in the opposite direction.

2. Apparatus as defined in claim 1 wherein said vent means comprises (1) a vertically disposed pipe in communication with said interior space and said space above said cover through a perforation in the cover, and (2) a one-way valve associated with said pipe.

3. Apparatus as defined in claim 2 wherein said valve is a swingable flap.

4. Apparatus as defined in claim 1 wherein a spherical float closes each of said tubes until said flowable material lifts the float by flowing thereagainst.

5. Apparatus as defined in claim 1 including an obturating means disposed in each of said tubes and formed of a material melted when contacted by said flowable material.

6. Apparatus as defined in claim 1 wherein said pan communicates with a container so that when said flowable material reaches a predetermined level therein, it flows to said container.

7. Apparatus as defined in claim 6 wherein said pan and container are disposed in superposed relation and communicate through a vertically disposed tube.

8. Apparatus for suppressing a fire caused by escape of liquid sodium from process equipment, comprising:
    a pan for receiving said sodium;
    a cover disposed on said pan and having a plurality of perforations formed in spaced relation therein;
    a plurality of tubes vertically disposed below said cover and having their upper ends attached thereto so that said tubes respectively communicate with the space above said cover through said cover perforations, the lower ends of said tubes closely approaching but being spaced above the bottom of said pan so that sodium entering one or more of said tubes will quickly establish a surface level above said lower tube ends;

a structural wall spaced from said pan;

heat insulation disposed between said structural wall and the side of said pan in spaced relation with the latter;

a support surface spaced below the bottom of said pan; and heat insulation disposed between the bottom of said pan and said support surface, vent means arranged to permit gas flow from the interior space within said pan and said cover to the space above said cover, and prevent gas flow in the opposite direction.

9. Apparatus as defined in claim 8 including a grate-type floor above said cover.

10. Apparatus as defined in claim 8 wherein the edge of said cover is spaced from the side of said pan and including a lip plate attached to said structural wall and projecting therefrom so as to extend between the edge of said cover and the side of said pan in spaced relation therewith, whereby gas is permitted to flow from the space between said pan and said structural wall and support surface to the space above said cover.

11. Apparatus as defined in claim 8 including means for introducing a non-combustible gas into the interior space within said pan and said cover.

* * * * *